UNITED STATES PATENT OFFICE 2,433,440

PYRIMIDINE COMPOUNDS

Francis Henry Swinden Curd, Clifford Gordon Raison, and Francis Leslie Rose, Blackley, Manchester, England, assignors to Imperial Chemical Industries Limited, a corporation of Great Britain No Drawing. Application September 1, 1944, Serial No. 552,383. In Great Britain April 6, 1944

2 Claims. (Cl. 260—251)

This invention relates to new pyrimidine compounds and to processes for making the same. The said new compounds, which will be more closely defined hereinafter, may be described broadly as pyrimidines bearing in the 2-position an arylamino group free from acidic substituents, in the 4-position a halogen atom and in the 6-position a hydrocarbon radical. They are useful as intermediates in the manufacture of chemotherapeutic agents and particularly of the antimalarial agents of copending applications Ser. Nos. 537,536 and 552,382.

It is an object of this invention to provide new pyrimidine compounds. A further object is to provide processes for making the same. A further object is to provide new intermediates for chemotherapeutic agents and processes for making the same. Further objects will appear hereinafter as the description proceeds. These and other objects are achieved by the following invention.

The said new compounds are 4-halogenopyrimidines of the formula

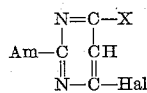

wherein Hal stands for a halogen atom, more particularly chlorine or bromine, X stands for a hydrocarbon radical and Am stands for an arylamino group which may be unsubstituted or may bear one or more simple non-acidic substituents such, for example, as halogen atoms, nitro groups, hydrocarbon radicals (which themselves may optionally bear simple substituents and which may be attached to the arylamino group directly or through an imino, sulphonyl or carbonyl group), alkoxy groups, alkyl mercapto groups, cyano groups or esterified carboxyl groups.

According to the invention we make the said new compounds by a process comprising the interaction of the corresponding 4-hydroxypyrimidine with a halogenating agent, namely the pentachloride, pentabromide, oxychloride, or oxybromide of phosphorus, or a mixture of such agents, for example, a mixture of phosphorus pentachloride and phosphorus oxychloride.

The reaction is conveniently brought about by heating the reagents together, optionally in the presence of a solvent or diluent. When phosphorus oxychloride is used as the halogenating agent an excess thereof forms a very convenient reaction medium. Alternatively an inert organic solvent, preferably boiling at or above 130° C., for example monochlorobenzene, may be used.

The 4-hydroxypyrimidines used as starting materials are conveniently made by the interaction of an appropriate arylamine with a 2-alkylmercapto-4-hydroxypyrimidine bearing a hydrocarbon radical in the 6-position as is described and claimed in our copending Application Ser. No. 552,382.

As examples of suitable hydroxypyrimidine starting materials there may be mentioned 2-anilino - 4 - hydroxy - 6 - methylpyrimidine, 2-p-chloroanilino-4-hydroxy-6-methylpyrimidine, 2-o-chloroanilino-4-hydroxy-6 - methylpyrimidine, 2-m-chloroanilino-4-hydroxy - 6 - methylpyrimidine, 2-(o-, m- and p-methylanilino)-4-hydroxy-6-methylpyrimidines, 2-o-methoxyanilino-4-hydroxy-6-methylpyrimidine, 2-p - methoxyanilino-4-hydroxy - 6 - methylpyrimidine, 2 - p-methoxyanilino-4-hydroxy-6 - phenylpyrimidine, 2-p-bromoanilino-4-hydroxy - 6 - methylpyrimidine, 2-p-bromoanilino-4-hydroxy- 6 - phenylpyrimidine, 2-p-methylmercaptoanilino-4-hydroxy-6-methylpyrimidine, 2-p - chloroanilino - 4 - hydroxy-6-ethylpyrimidine, 2-p-bromoanilino-4-hydroxy-6-ethylpyrimidine, 2-(2':4' - dichloroanilino)-4-hydroxy-6-methylpyrimidine, 2 - (2':5'-dichloroanilino) -4-hydroxy-6- methylpyrimidine, 2-3':4'-dichloroanilino)-4-hydroxy-6- methylpyrimidine, 2-(3':5'-dichloroanilino)-4-hydroxy-6-methylpyrimidine, 2 - (3':5'-dibromoanilino)-4-hydroxy-6-methylpyrimidine, 2 - (2'-methyl-4'-chloroanilino)-4-hydroxy - 6 - methylpyrimidine, 2-(3'-chloro-4'-methylanilino) - 4 - hydroxy - 6-methylpyrimidine, 2-(3':4'-dimethylanilino) - 4-hydroxy-6-methylpyrimidine, 2-(3':5'-dimethylanilino)-4-hydroxy - 6 - methylpyrimidine, 2 - β-naphthylamino-4-hydroxy-6 - methylpyrimidine, 2-(6'-bromo-2'-naphthylamino) - 4 - hydroxy-6-methylpyrimidine, 2-(6'-methoxy-2'- naphthylamino)-4 - hydroxy - 6 - methylpyrimidine, 2-α-naphthylamino-4-hydroxy- 6 - methylpyrimidine, 2-(4'-chloro-1'- naphthylamino) - 4 - hydroxy-6-methylpyrimidine, 2-p-chloroanilino-4-hydroxy-6-phenylpyrimidine, 2- p - ethoxyanilino - 4 - hydroxy-6-methylpyrimidine, 2-p-n - butylanilino - 4-hydroxy-6-methylpyrimidine, 2-p - phenylanilino-4-hydroxy-6-methylpyrimidine, 2-p - nitroanilino-4 - hydroxy - 6 - methylpyrimidine, 2 - p-nitroanilino-4-hydroxy-6-phenylpyrimidine, 2-p-carbomethoxyanilino-4-hydroxy-6- methylpyrimidine, 2-p-cyanoanilino-4-hydroxy-6 - methylpyrimidine and 2-p-cyanoanilino - 4 - hydroxy - 6-phenylpyrimidine.

The following examples, in which the parts are by weight, illustrate the invention.

Example 1

A mixture of 47 parts of 2-p-chloroanilino-4-hydroxy-6-methylpyrimidine and 200 parts of phosphorous oxychloride is heated to boiling for 3 hours. After distilling off the excess of phosphorus oxychloride in vacuo at 50–60° C., the residue is stirred with ice and water. On adding ammonia to render the mixture faintly alkaline and stirring, the product solidifies. It is filtered off, washed with water and after drying purified by crystallisation from ethyl alcohol. There is thus obtained 4 - chloro - 2 - p - chloroanilino-6-methylpyrimidine M. P. 126–127° C.

Example 2

46.2 parts of 2-p-anisidino-4-hydroxy-6-methylpyrimidine and 195 parts of phosphorus oxychloride are refluxed together for 2 hours. The excess of phosphorus oxychloride is removed by distillation in vacuo at 50–60° C. The oily residue is stirred with ice water and ammonia whereupon it gradually solidifies. It is then filtered off, washed with water and crystallised from ethyl alcohol. 4-chloro-2-p-anisidino-6-methylpyrimidine is thus obtained with M. P. 103–105° C.

In a similar manner, starting with 2-(p-ethoxyphenyl)-4-hydroxy-6-methylpyrimidine, there is obtained 4-chloro-2-(p-ethoxyphenyl)-6-methylpyrimidine which, after crystallisation from ethanol, has M. P. 116°–118° C.

Example 3

A mixture of 22 parts of 2-p-toluidino-4-hydroxy-6-methylpyrimidine and 106 parts of phosphorus oxychloride is heated to boiling for 3 hours. After distilling off the excess of phosphorus oxychloride in vacuo at 60–65° C., the residue is stirred with ice and water. On adding ammonia to render the mixture faintly alkaline and stirring, the product solidifies. It is filtered off, washed with water and purified by crystallisation from ethyl alcohol. 4-chloro-2-p-toluidino-6-methylpyrimidine is thus obtained as irregular colourless tabular crystals, M. P. 104–106° C.

Example 4

23 parts of 2-p-methylmercaptoanilino-4-hydroxy-6-methylpyrimidine and 106 parts of phosphorus oxychloride are refluxed together for 3 hours. The excess of phosphorus oxychloride is removed by distillation in vacuo at 60–65° C. The residue is stirred with ice and water until it solidifies. Ammonia is then added to make the mixture faintly alkaline and stirring is continued for several hours. The product is then filtered off, washed with water and crystallised from ethyl alcohol, whereby 4-chloro-2-p-methylmercaptoanilino-6-methylpyrimidine is obtained in the form of colourless needles, M. P. 81–82° C.

In a similar way from 2-p-cyanoanilino-4-hydroxy-6-methylpyrimidine there is obtained 2-p-cyanoanilino - 4 - chloro-6-methylpyrimidine of M. P. 215°–216° C.

Similarly from 2-p-nitroanilino-4-hydroxy-6-methylpyrimidine there is obtained 2-p-nitroanilino - 4 - chloro-6-methylpyrimidine of M. P. 248°–250° C.

Example 5

A mixture of 25.1 parts of 2-β-naphthylamino-4-hydroxy-6-methylpyrimidine and 62.5 parts of phosphorus oxychloride is heated to boiling for 3 hours. After distilling off the excess of phosphorus oxychloride in vacuo at 50–60° C., the residue is added to ice and water. The mixture is stirred for some time and then ammonia is added to render the mixture faintly alkaline and after a further 2 hours stirring the solid product is filtered off, washed with water and dried. By crystallisation from ethanol 4-chloro-2-β-naphthylamino-6-methylpyrimidine is obtained as colourless thick prisms, M. P. 145–147° C.

Example 6

A mixture of 26.3 parts of 2-(6'-bromo-2'-naphthylamino)-4-hydroxy-6-methylpyrimidine and 167 parts of phosphorus oxychloride is heated to boiling for 2 hours. After distilling off the excess of phosphorus oxychloride in vacuo at 50–60° C., the residue is added to ice and water and the mixture so obtained is stirred for a short time. It is then made faintly alkaline by addition of ammonia and the solid product is filtered off. It is stirred for 1 hour with 75 parts of methanol and ammonia is added to render the mixture faintly alkaline. 100 parts of water are then added and after stirring again for 1 hour, the product is filtered off and washed, first with water and then with methanol, and dried at 40–45° C. It is then crystallised from ethanol whereby 4-chloro-2-(6'-bromo-2'-naphthylamino)-6-methylpyrimidine is obtained in the form of needles, M. P. 152–153° C.

In a similar way, starting from 2-(6'-methoxy-2' - naphthylamino) -4-hydroxy-6-methylpyrimidine there is obtained 4-chloro-2-(6'-methoxy-2'-naphthylamino) - 6 - methylpyrimidine which, after crystallisation from ethanol, has M. P. 148°–150° C.

Example 7

25 parts of 2-(2':4'-dichloroanilino)-4-hydroxy-6-methylpyrimidine and 106 parts of phosphorus oxychloride are refluxed together for 3 hours. The excess of phosphorus oxychloride is removed by distillation in vacuo at 60–65° C. The residue is stirred with ice and water until it solidifies. Ammonia is added until the mixture is alkaline and the stirring is continued, with further addition of ammonia if necessary, until a persistent alkaline reaction is obtained. The solid is then filtered off, washed with water and dried in vacuo. After crystallisation from ethyl alcohol, the 4-chloro-2-(2':4'-dichloranilino)-6-methylpyrimidine, thus obtained, melts at 120–122° C.

In a similar way, starting from 2-(3':4'-dichloroanilino)-4-hydroxy - 6 - methylpyrimidine there is obtained 4-chloro-2-(3':4'-dichloroanilino)-6-methylpyrimidine of M. P. 134°–136° C.

Similarly from 2-(3':5'-dibromoanilino)-4-hydroxy-6-methylpyrimidine there is obtained 4-chloro-2-(3':5'-dibromoanilino) - 6 - methylpyrimidine of M. P. 131°–132° C.

Example 8

25 parts of 2-(2'-methyl-4'-chloroanilino)-4-hydroxy-6-methylpyrimidine and 106 parts of phosphorus oxychloride are refluxed together for 3 hours. The excess of phosphorus oxychloride is removed by distillation in vacuo at 60–65° C. The residue is stirred for 2 hours with ice and water and the aqueous portion is separated off and rejected. The residue is dissolved in ethanol. The solution is made alkaline by addition of ammonia and the base is then precipitated by addition of water. The precipitate is filtered off, washed with water and crystallised from ethyl alcohol.

4-chloro-2-(2'-methyl-4'-chloroanilino)-6-methylpyrimidine is thus obtained with M. P. 107–108° C.

In a similar manner, by using 4-hydroxy-2-(3'-chloro-4'-methylanilino)-6-methylpyrimidine as starting material, 4-chloro-2-(3'-chloro-4'-methylanilino)-6-methylpyrimidine is obtained; it has M. P. 115–117° C.

In a similar way, starting from 2-(2':5'-dichloroanilino)-4-hydroxy-6-methylpyrimidine there is obtained 4-chloro-2-(2':5'-dichloroanilino)-6-methylpyrimidine of M. P. 101° C.

Similarly from 2-(3':4'-dimethylanilino)-4-hydroxy-6-methylpyrimidine there is obtained 4-chloro-2-(3':4'-dimethylanilino)-6-methylpyrimidine of M. P. 128°–129° C.

From 2-(3':5'-dimethylanilino)-4-hydroxy-6-methylpyrimidine there is obtained 4-chloro-2-(3':5'-dimethylanilino)-6-methylpyrimidine of M. P. 86°–88° C.

From 2-(4'-bromoanilino)-4-hydroxy-6-methylpyrimidine there is obtained 4-chloro-2-(4'-bromoanilino)-6-methylpyrimidine of M. P. 140–141° C.

From 2-(4'-n-butylanilino)-4-hydroxy-6-methylpyrimidine there is obtained 4-chloro-2-(4'-n-butylanilino)-6-methylpyrimidine of M. P. 51°–53° C.

*Example 9*

A mixture of 25.9 parts of 2-(3'-chloroanilino)-4-hydroxy-6-methylpyrimidine and 65 parts of phosphorus oxychloride is refluxed for 3 hours. The excess of phosphorus oxychloride is then distilled off in vacuo at 50–60° C. and the residue is added to ice and water. After stirring for 1 hour the aqueous portion is separated off and the residue is dissolved in ethanol. Dilute aqueous ammonia is added until the mixture is alkaline, and it is then stirred, with further addition of ammonia if necessary, until it remains persistently alkaline for at least 1 hour. The solid which has separated out is then filtered off, washed with water, dried in vacuo and crystallised from ethanol. There is thus obtained 4-chloro-2-(3'-chloroanilino)-6-methylpyrimidine of M. P. 116–118° C.

In a similar way, by using 4-hydroxy-2-(2'-chloroanilino)-6-methylpyrimidine as starting material, there is obtained 4-chloro-2-(2'-chloroanilino)-6-methylpyrimidine of M. P. 99–100° C.

Similarly from 4-hydroxy-2-(2'-methylanilino)-6-methylpyrimidine there is obtained 4-chloro-2-(2'-methylanilino)-6-methylpyrimidine of M. P. 116°–118° C.

From 4-hydroxy-2-(3'-methylanilino)-6-methylpyrimidine there is obtained 4-chloro-2-(3'-methylanilino)-6-methylpyrimidine of M. P. 101°–102° C.

*Example 10*

20 parts of 2-anilino-4-hydroxy-6-methylpyrimidine and 50 parts of phosphorus oxychloride are refluxed together for 2½ hours. The phosphorus oxychloride remaining uncombined is then distilled off in vacuo at 60° C. and the residue is added to ice and water. Ammonia is added to render the mixture alkaline and it is stirred for 3 hours, further additions of ammonia being made to maintain the alkalinity if necessary. The solid so formed is filtered off, washed well with water and dried at 60–65° C. By crystallisation from petroleum ether (B. P. 80–100° C.) the 4-chloro-2-anilino-6-methylpyrimidine so formed is obtained as colourless needles; M. P. 92–94° C.

In a similar way, starting from 4-hydroxy-2-(2'-methoxyanilino)-6-methylpyrimidine there is obtained 4-chloro-2-(2'-methoxyanilino)-6-methylpyrimidine of 103°–104° C.

*Example 11*

9.3 parts of 2-p-chloroanilino-4-hydroxy-6-phenylpyrimidine (American Chemical Journal, 1903, vol. 29, p. 490) are refluxed with 30 parts of phosphorus oxychloride for 1½ hours. The excess of phosphorus oxychloride is then distilled off under diminished pressure at 60–65° C. The residue is stirred with ice and water. The mixture is made alkaline with ammonia and stirring is continued for 1 hour. The crude 2-(4'-chloroanilino)-4-chloro-6-phenylpyrimidine is then filtered off, washed with water and dried. After crystallisation from ethanol it has M. P. 166–168° C.

*Example 12*

26 parts of 2-(4'-dimethylamino-anilino)-4-hydroxy-6-methylpyrimidine and 106 parts of phosphorus oxychloride are refluxed together for 3 hours. The excess of phosphorus oxychloride is removed by distillation in vacuo at 60–65° C. The oily residue is stirred with ice and water until it dissolves. Ammonia is then gradually added until the solution is alkaline, whereupon 4-chloro-2-(4'-dimethylaminoanilino)-6-methylpyrimidine is precipitated. It is filtered off, washed with water and dried in vacuo. After crystallisation from petroleum ether (B. P. 100–120° C.), it has M. P. 157–159° C.

*Example 13*

25 parts of 2-p-carbomethoxyanilino-4-hydroxy-6-methylpyrimidine and 105 parts of phosphorus oxychloride are refluxed together for 3 hours. The excess of phosphorus oxychloride is then distilled off in vacuo at 60°–65° C. The residue crystallises. It is stirred with ice and water for half an hour, ammonia being added to make the mixture faintly alkaline. The solid is then filtered off, washed with water, dried in vacuo and recrystallised from β-ethoxyethanol. There is thus obtained 4-chloro-2-(4'-carbomethoxyanilino)-6-methylpyrimidine of M. P. 223°–225° C.

In a similar way, from 2-p-phenylanilino-4-hydroxy-6-methylpyrimidine there is obtained 2-(4'-phenylanilino)-4-chloro-6-methylpyrimidine of M. P. 124°–125° C.

*Example 14*

A mixture of 7.5 parts of 2-(1'-naphthylamino)-4-hydroxy-6-methylpyrimidine and 33 parts of phosphorus oxychloride is heated to 100°–110° C. for 1 hour. The reaction mixture is then cooled and added to ice and water. Ammonia is added to make the mixture alkaline and the product is extracted with ether. The ether solution is washed with water and dried over anhydrous sodium sulphate and the ether is distilled off. The residue, which is 4-chloro-2-(1'-naphthylamino)6-methylpyrimidine, is crystallised from ethanol and then has M. P. 131°–132° C.

In a similar way, from 2-(4'-chloro-1'-naphthylamino)-4-hydroxy-6-methylpyrimidine there is obtained 4-chloro-2-(4'-chloro-1'-naphthylamino)-6-methylpyrimidine of M. P. 170° C.

Whereas the above description and examples illustrate many widely varied embodiments of the invention it will be apparent to one skilled in the art that many other embodiments and variations may be devised without departing from the spirit and scope thereof and accordingly it is to be understood that the invention is not in any way limited except as defined in the following claims.

We claim:

1. A pyrimidine compound corresponding to the formula

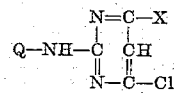

wherein X is a hydrocarbon radical selected from the group consisting of methyl, ethyl and phenyl, while Q is a phenyl radical bearing at least one halogen atom selected from the group consisting of chlorine and bromine.

2. As a new compound, 4-chloro-6-methyl-2-(4'-chloroanilino)-pyrimidine, corresponding to the formula

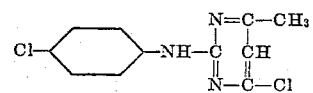

FRANCIS HENRY SWINDEN CURD.
CLIFFORD GORDON RAISON.
FRANCIS LESLIE ROSE.

REFERENCES CITED

The following references are of record in the file of this patent:

Berichte de Deut. Gess., vol. 32 (1899), page 2926.

Chemical Reviews, Oct. 1933, vol. XIII, No. 2, page 226.